Patented Dec. 5, 1944

2,364,108

UNITED STATES PATENT OFFICE 2,364,108

BONDED SILICON CARBIDE REFRACTORIES

John P. Swentzel, Niagara Falls, N. Y., assignor to The Carborundum Company, Niagara Falls, N. Y., a corporation of Delaware No Drawing. Application September 25, 1940, Serial No. 358,338

9 Claims. (Cl. 106—44)

This invention relates to bonded silicon carbide refractory compositions and to methods of formulating them. More particularly it relates to bonded silicon carbide refractory shapes made from such compositions, which shapes not only possess high thermal conductivity and strength at elevated temperatures, but also are especially resistant to oxidation under severe oxidizing conditions.

Failure of silicon carbide refractories is manifested in many different ways depending upon the type of bond, size of granules and methods of manufacture and use. For example, certain bonded silicon carbide refractories after a period of service show an increase in volume often amounting to as much as 10% or more and become soft and weak without cracking whereas others crack and distort badly with a relatively small increase in volume. Still others show readily discernible expansion with but little increase in weight while some gain considerably in weight before expansion takes place. However, an increase in weight or volume is generally an indication of approaching failure of the refractory, as slight as 3-5% gain often rendering the refractory useless.

This increase in weight and/or volume of silicon carbide refractories is best explained by the fact that silicon carbide having a molecular weight of 40, in undergoing oxidation, is transformed to silica having a molecular weight of 60. In other words, for every gram of silicon carbide in the original article which becomes oxidized there is produced 1.5 grams of silica. The silica formed is usually cristobalite with a density of 2.32 as compared to a density of 3.17 for silicon carbide, which further explains the increase in volume and accounts for the failure of originally dense refractories due to expansion and disruption. The destruction of such refractories after they have developed a high silica content is hastened by the inversion of the silica from one crystal form to another as it passes through specific fairly low temperature ranges. Further, the high thermal conductivity and resistance to spalling which are two of the valuable physical properties of bonded silicon carbide refractories both decrease as the silicon carbide is converted to silica.

Regardless of how such failures are manifested it is believed that most, if not all, silicon carbide refractory bodies ultimately fail due to oxidation of the silicon carbide to silica with the attendant consequences, unless the bond itself fails first. In some cases silicon carbide refractories have failed due to oxidation even in so-called reducing atmospheres. In fact, it is considered that alternating reducing and oxidizing atmospheres are more destructive from an oxidation standpoint than a consistently oxidizing atmosphere because of the effect of such fluctuations in conditions in preventing the formation of any protective coating for the silicon carbide granules or in destroying such protective coatings after they might have formed.

Heretofore all efforts to produce a bond for silicon carbide articles which would be oxidation resistant and also would retain a high strength at elevated temperatures have been only partly successful. Clays and other ingredients producing bonds of the porcelain type have resulted in bodies which have had good hot strength, but which were not sufficiently oxidation resistant to give a satisfactory life. Other silicon carbide bodies using bonds of a glassy nature have been fairly resistant to oxidation, only to fail at operating temperatures because of softening of the glass bond and loss of strength. Attempts to retard oxidation by application of various glazes to the formed article have similarly not been entirely successful because of the temporary character of the glaze and exposure of the silicon carbide granules to direct oxidizing influences after the glaze has been destroyed.

The high resistance to spalling as well as the high strengths retained at elevated temperatures have also led to the use of coke residue bonds in spite of the fact that such bonds are even more susceptible to rapid oxidation and destruction than is silicon carbide. These coke residue bonded articles have at times been modified by the incorporation of metallic and other substances to protect the easily destroyed coke-residue binder which, however, has been considered essential in order to keep the porosity of the article low and to produce the requisite high strength and resistance to spalling of the bonded body. Regardless of the type of bond heretofore used each one has possessed some specific disadvantage to limit its field of application or appreciably shorten its useful life.

It is an object of the present invention to provide an improved silicon carbide refractory body which is highly resistant to oxidation in use, and which at the same time will stand up under heavy loads at high temperatures. It is a further object to provide a refractory body in which all constituents are substantially resistant to detrimental oxidation, including the greater part, if not all, of the bonding ingredients. It is a still further object to provide a bond which will enhance the thermal conductivity and produce the requisite strength at high temperatures and will also eliminate the need for any substance of low oxidation resistance such as carbonaceous materials.

In accordance with the present invention, silicon carbide articles are formed in which the silicon carbide grains are held together by a metal or metal alloy bond. This metallic bond is uniformly distributed throughout the body of the article and remains for the most part in the metallic state within the article, although it is potentially reactive and on the exposed surfaces of the article it reacts to form an oxidation-resistant glaze which protects the body of the object from further oxidation. The metal alloy is incorporated in the mix in the form of a fine powder.

Manganese metal alloys have been found effective in carrying out the present invention; ferromanganese silicon, silico manganese and ferromanganese are typical examples of manganese alloys adaptable to the present use as bonds for silicon carbide refractory articles. Spiegeleisen and silicospiegel are two more manganese alloys which may be embodied as a bond. Other alloys which may suitably be used in a similar capacity are those metal alloys commonly known and used in steel founding operations as deoxidizers, and include in addition to the above such alloys as manganese-copper, ferrosilicon, calcium-silicon, calcium - manganese - silicon, barium - silicon, nickel-zirconium and zirconium-silicon alloys.

The use of 0.5 to 10% of a metal alloy such as ferro-manganese-silicon as a bond produces a refractory and oxidation-resistant silicon carbide body and in making articles for general refractory purposes such as standard bricks for furnace linings the amounts of metal alloy are normally confined to these percentage limits. However, in those applications where a high thermal conductivity may be desired, as for example in furnace muffles or kiln furniture such as thin setter tiles it has been found to give satisfactory results to form silicon carbide refractory shapes containing as high as 50% of a similar metal alloy.

The following example is illustrative of mixes made according to the present invention using metal alloy bonds for the making of standard size refractory brick and the like where high refractoriness and corrosive conditions are likely to be encountered:

*Example I*

|  | Parts by weight |
|---|---|
| 14 and finer silicon carbide grain | 93 |
| Powdered silicon carbide | 7 |
| Ferromanganese-silicon powder | 2 |
| Dry lignone | 3 |

The silicon carbide grain may be selected in a gradation of grit sizes such as to produce a maximum density. The ferro-manganese-silicon used is in finely divided form. In mixing the various ingredients the ferromanganese-silicon powder is thoroughly mixed dry with the fine fraction of silicon carbide and the dry temporary binder, after which it is mixed with the coarser fractions of silicon carbide grain in the dry state, followed by mixing wet in an ordinary kneader mixer, sufficient water being added to bring the batch to a pressing consistency. Bricks are then formed by pressing in a hydraulic press at a pressure in excess of 5,000 pounds per square inch. The shaped articles are then dried in the usual manner at 220° F. and finally fired in a kiln at 1415° C. Drying the articles may be carried out at other temperatures with satisfactory results and is controlled in well known ways to adapt it to the size and shape of the article. Firing may also be at 1300 to 1450° C.

*Example II*

Example II illustrates a mix within the scope of the present invention suitable for making setter tile, muffles and the like where a prime requisite is high thermal conductivity as well as adequate oxidation resistance.

|  | Parts by weight |
|---|---|
| 14 and finer silicon carbide grain | 57 |
| Powdered silicon carbide | 3 |
| Ferromanganese silicon | 40 |
| Dry lignone | 3 |

The silicon carbide grain is selected as to grit size as in the previous example to produce a maximum density. Likewise the various finely divided materials, including the metals, are first dry mixed thoroughly, after which they are admixed dry with the coarser portions of silicon carbide grain, followed by mixing wet in an ordinary kneader mixer, sufficient water being added to bring to a tamping consistency. In making thin, flat tile ½" to 1" in thickness the silicon carbide bodies are formed by tamping with an air hammer according to standard tamping procedure. The shaped articles are then dried in the usual manner at 220° F. (although a somewhat higher or lower temperature may be used) after which they are fired in a reducing atmosphere to 1300° C. in a mixture of coke and sand. Temperatures as low as 1100° C. have been successfully used in the firing of those bodies containing the higher percentages of metallic bond.

The silicon carbide used is a relatively pure grade of grain showing by analysis over 96% silicon carbide, with less than 2% each of iron oxide and aluminum oxide, and only traces of such impurities as calcium oxide, sodium oxide, potassium oxide, etc., any remainder being silica. A small amount of finely divided silicon carbide is usually incorporated as a bonding ingredient as it helps to provide a denser final product and appears to more readily unite with the metal alloy to improve the strength and oxidation resistance of the fired article. It might be expected that the presence of more finely divided silicon carbide would result in increased rates of oxidation and more rapid failure due to the difference in the area exposed per unit weight. The powdered or colloidal silicon carbide used need not be as pure as the coarser grains of silicon carbide, containing the same impurities but in slightly higher amounts and having a silicon carbide content greater than 85% of the weight. The ferromanganese silicon used in the specific examples given above has the following approximate analysis: manganese 20%, silicon 48%, and the remainder mostly iron.

Metal alloy bonded articles made according to the above procedure exhibit a marked superiority over similar pieces of hitherto standard high grade silicon carbide refractories. When exposed to severe oxidizing conditions the metal bonded bricks gain less in weight (after the external glaze forms) than do any other silicon carbide pieces with which I am familiar, when subjected to identical conditions. Furthermore, subjection of the refractory shapes of the present invention to heavy loads while hot has shown that they retain their cold strength to a remarkable degree even when heated to high temperatures. In addition, the use of a metallic bond increases the thermal conductivity of the resulting articles appreciably, and as a result failure due to any localized heating and development of hot spots causing spalling is minimized. This effect is illustrated where pieces having metal alloy bonds are subjected to heat shock when they show a marked resistance to breakage or cracking.

The finished, fired refractory body of the present invention when made as above described and ready for use is covered with a smooth, thin, shiny glaze, usually gray or brownish in color. However, copper plating formed on a freshly fractured surface when a broken piece of one of these refractories is dipped into a solution of copper sulfate acidified with hydrofluoric acid shows that the metal alloy bond on the inside of the article has not been oxidized or changed and remains in the metallic state, although the uniformity and continuity of the copper plating indicates that the metal bond has been uniformly distributed between the grains of refractory material throughout the body of the article and that substantially all of the silicon carbide granules are encased in a protective film of the metal bond.

The fractured surfaces of broken pieces of metal alloy bonded silicon carbide refractory quickly glaze over upon subsequent firing to protect the interior which is the most vulnerable section of most silicon carbide refractories. The glazed surface or coating so formed becomes more glass-like the longer it remains in the furnace, whereas fractured faces of other types of bonded silicon carbide bodies, if originally glazed, soon lose their glass-like appearance and become dull, indicating devitrification.

It is difficult to offer a good theory as to why metal bonded silicon carbide refractories of the herein described type should be so outstanding in oxidation-resistance and durability, as well as possessing such high hot strength and spall resistance. It is believed that the impurities of silica, alumina, iron, etc. in the refractory grain as well as the silica formed in situ by the oxidation of a small portion of the silicon carbide grain itself during the carbonizing period in the original firing react with the metal alloy to protect the silicon carbide from further oxidation. The resulting reaction product is believed to be a glass containing oxides and silicates of manganese or similar metals having a relatively high softening point and a substantial resistance to penetration by oxidizing gases. It has been shown that this oxidation resistant glass forms only at the surface, the metal alloy remaining essentially in the metallic state throughout the body of the article and surrounding the silicon carbide grains. The fact remains, whatever the explanation, that metal alloy bonds as set forth herein produce a superior silicon carbide refractory especially in regard to oxidation resistance.

It is desired to point out that the above silicon carbides bodies may be modified in various ways by addition or substitution of other ingredients without departing from the spirit or scope of the present invention. For instance, a more plastic composition can be created by the addition of one or more clays to the mix in minor amounts. This modification is particularly applicable to the fabrication of more intricate shapes or of articles which are to be used at lower temperatures where ultra high refractoriness is not required. Similarly silicon carbide bodies can be made according to the present invention, but in which a part of the silicon carbide grain, either the coarse or the fine fractions, is replaced by a refractory oxide silicate or spinel such as alumina, mullite, magnesia or the like. Also the articles may be formed by other well known methods than pressing or tamping such as by jolting, vibrational tamping, extrusion or slip-casting.

Having thus described the invention in a clear and operable manner, it is desired to claim:

1. A bonded silicon carbide article consisting of silicon carbide grain together with minor amounts of a refractory clay and containing as a bond 0.5 to 50% of a metal alloy selected from the group of metal alloys consisting of manganese alloys and silicon alloys and commonly known as deoxidizers in the founding of ferrous metals.

2. A bonded silicon carbide refractory article consisting of silicon carbide grains and a glaze-developing deoxidizing metal alloy selected from the group consisting of manganese alloys and silicon alloys, said bond amounting to 0.5 to 50% by weight of the article.

3. A bonded silicon carbide refractory article consisting of silicon carbide grains and a glaze-developing deoxidizing metal alloy selected from the group consisting of manganese alloys and silicon alloys, said bond amounting to 0.5 to 10% by weight of the article.

4. A bonded silicon carbide refractory article composed of silicon carbide grains and 0.5 to 50% by weight of a manganese metal alloy.

5. A bonded silicon carbide refractory article composed of silicon carbide grains and 0.5 to 10% by weight of a ferromanganese-silicon metal alloy.

6. A bonded silicon carbide refractory article composed of silicon carbide grains and 0.5 to 50% by weight of a ferromanganese-silicon metal alloy.

7. A bonded silicon refractory article consisting of silicon carbide grains and 0.5 to 50% by weight of a ferrosilicon metal alloy.

8. A bonded silicon carbide article consisting of silicon carbide grain and 0.5 to 50% by weight of a silico-manganese alloy.

9. A raw batch for the manufacture of refractory shapes, said raw batch consisting of 14 and finer mesh silicon carbide grains selected in a gradation of grit sizes such as to produce a maximum density in articles formed therefrom and 0.5 to 50% by weight of a powdered deoxidizing metal alloy selected from the group consisting of manganese alloys and silicon alloys.

JOHN P. SWENTZEL.